(12) United States Patent
Doyle et al.

(10) Patent No.: US 11,283,162 B2
(45) Date of Patent: Mar. 22, 2022

(54) TRANSITIONAL WAVEGUIDE STRUCTURES AND RELATED SENSOR ASSEMBLIES

(71) Applicant: VEONEER US, INC., Southfield, MI (US)

(72) Inventors: Scott B. Doyle, Sudbury, ME (US); Angelos Alexanian, Lexington, ME (US); Konstantinos Konstantinidis, Wurzburg (DE)

(73) Assignee: Veoneer US, Inc., Southfield, MI (US)

( * ) Notice: Subject to any disclaimer, the term of this patent is extended or adjusted under 35 U.S.C. 154(b) by 313 days.

(21) Appl. No.: 16/520,257

(22) Filed: Jul. 23, 2019

(65) Prior Publication Data

US 2021/0028529 A1    Jan. 28, 2021

(51) Int. Cl.
| | |
|---|---|
| *H01Q 1/32* | (2006.01) |
| *H01P 5/08* | (2006.01) |
| *G01S 13/931* | (2020.01) |
| *G01S 7/03* | (2006.01) |
| *H01P 5/02* | (2006.01) |
| *H01Q 21/00* | (2006.01) |
| *H01P 3/123* | (2006.01) |

(52) U.S. Cl.
CPC ........... *H01Q 1/3233* (2013.01); *G01S 7/032* (2013.01); *G01S 13/931* (2013.01); *H01P 3/123* (2013.01); *H01P 5/024* (2013.01); *H01P 5/08* (2013.01); *H01Q 21/0043* (2013.01)

(58) Field of Classification Search
CPC .......... H01P 3/121; H01P 3/123; H01P 5/022; H01P 5/024; H01P 5/04; H01P 5/08; H01P 5/082; H01P 5/1007; H01P 5/103; H01P 5/107; H01Q 1/3233; H01Q 13/0233; H01Q 21/0037; H01Q 21/0043; H01Q 21/005; H01Q 21/0093; G01S 7/032; G01S 13/931
USPC .............. 333/32–34, 248, 253, 254; 342/771
See application file for complete search history.

(56) References Cited

U.S. PATENT DOCUMENTS

| | | | |
|---|---|---|---|
| 3,157,845 A | * | 11/1964 | White ...................... H01P 5/082 333/21 R |
| 3,224,004 A | | 12/1965 | Barthez |

(Continued)

FOREIGN PATENT DOCUMENTS

| | | |
|---|---|---|
| CN | 102931492 | 2/2015 |
| CN | 106207357 | 12/2016 |

(Continued)

OTHER PUBLICATIONS

CN102931492, Feb. 11, 2015, Beijing Institute of Telemetry Technology, Machine Translation (9 pages).

(Continued)

*Primary Examiner* — Barbara Summons
(74) *Attorney, Agent, or Firm* — Matthew D. Thayne; Thayne and Davis LLC (57) ABSTRACT

Antenna assemblies for vehicles, such as RADAR sensor antenna assemblies. In some embodiments, the assembly may comprise an antenna block defining a waveguide groove and an adapter portion comprising a ridge. The ridge may taper or otherwise transition in height and/or width to facilitate a transition between two adjacent elements of the assembly, such as two adjacent waveguide structures comprising ridges having different cross-sectional dimensions.

19 Claims, 8 Drawing Sheets

(56) References Cited

U.S. PATENT DOCUMENTS

| | | | | |
|---|---|---|---|---|
| 4,992,762 | A * | 2/1991 | Godshalk | H01P 3/123 333/239 |
| 6,794,950 | B2 * | 9/2004 | du Toit | H01P 5/107 333/21 R |
| 7,132,905 | B2 | 11/2006 | Sano | |
| 7,336,141 | B2 * | 2/2008 | Mueller | H01P 5/107 333/26 |
| 8,779,995 | B2 | 7/2014 | Kirino et al. | |
| 8,803,638 | B2 | 8/2014 | Kildal | |
| 9,153,851 | B2 | 10/2015 | Nakamura | |
| 9,252,475 | B2 | 2/2016 | Milyakh et a. | |
| 9,666,931 | B2 | 5/2017 | Suzuki | |
| 10,164,344 | B2 | 12/2018 | Kirino et al. | |
| 10,381,317 | B2 * | 8/2019 | Maaskant | H01P 3/121 |
| 2011/0050356 | A1 | 3/2011 | Nakamura et al. | |
| 2012/0171981 | A1 * | 7/2012 | Hiers | H01Q 13/0275 455/334 |
| 2013/0127680 | A1 * | 5/2013 | Yun | H01Q 13/0275 343/776 |
| 2014/0111392 | A1 * | 4/2014 | Ou | H01P 5/08 343/767 |
| 2016/0254582 | A1 | 9/2016 | Jensen | |
| 2017/0187121 | A1 | 6/2017 | Kirino et al. | |
| 2018/0269557 | A1 * | 9/2018 | Fangfang | H01Q 13/106 |
| 2018/0301816 | A1 | 10/2018 | Kamo et al. | |
| 2018/0351261 | A1 | 12/2018 | Kamo et al. | |
| 2019/0057945 | A1 * | 2/2019 | Maaskant | H01P 11/002 |
| 2020/0168974 | A1 | 5/2020 | Vosoogh | |
| 2021/0028527 | A1 * | 1/2021 | Doyle | H01Q 1/3233 |

FOREIGN PATENT DOCUMENTS

| | | | |
|---|---|---|---|
| JP | 2002-344212 A | * | 11/2002 |
| WO | 2019022651 | | 1/2019 |

OTHER PUBLICATIONS

CN106207357, Dec. 7, 2017, Chengdu Xanaway Technology Co., Ltd., Machine Translation (58 pages).

Oct. 9, 2020, PCT/US2020/042830, International Search Report, (3 pages).

Oct. 9, 2020, PCT/US2020/042830, Written Opinion, (10 pages).

* cited by examiner

TRANSITIONAL WAVEGUIDE STRUCTURES AND RELATED SENSOR ASSEMBLIES

SUMMARY

Disclosed herein are various embodiments of sensor and/or antenna assemblies comprising waveguide structures having transitional elements. In preferred embodiments, such assemblies may comprise RADAR sensor modules for vehicles, including one or more novel and inventive features disclosed herein.

For example, in some embodiments disclosed herein, an antenna block, which may comprise a casting, having waveguide structures formed therein. For example, an array of one or more waveguide grooves may be formed, in some cases with a waveguide ridge formed therein. In some embodiments, the waveguide grooves may be formed using a plurality of posts that may be formed in rows on opposite sides of the waveguide ridge.

In a more particular example of an antenna module, such as a vehicle RADAR module according to some embodiments, the module may comprise an antenna block defining a waveguide groove on a first side of the antenna block. A ridge may be formed and may extend within the waveguide groove. The ridge may comprise an adapter portion, which may couple two adjacent ridge portions. The adapter portion may comprise a first end having a first height and a first width and a second end opposite the first end having a second height and a second width. The first height may differ from the second height and/or the first width may differ from the second width.

In some embodiments, the adapter portion may be considered part of a larger waveguide structure rather than just the ridge. For example, the width and/or depth of a groove of the waveguide, rather than the ridge of the waveguide, may taper or otherwise transition in height and/or width either in addition to the ridge itself transitioning or as an alternative to the ridge of the waveguide transitioning.

In some embodiments, the second height may be greater than the first height, and the second width may be less than the first width such that the ridge transitions from a relatively wide, short portion to a relatively narrow, tall portion.

In some embodiments, the adapter portion may smoothly transition between the first width and the second width and/or may smoothly transition between the first height and the second height.

In some embodiments, the adapter portion may comprise a plurality of distinct sections, and a ridge of each of the plurality of distinct sections may transition between a respective first height and second height differing from the respective first height, and between a respective first width and second width differing from the respective first width.

In some embodiments, the waveguide groove may be at least partially, or wholly, defined by a plurality of posts positioned opposite from one another, preferably with the ridge positioned within the waveguide groove between opposite posts, such as opposite rows of posts, of the plurality of posts. In some such embodiments, the plurality of posts may comprise a first set of posts comprising at least two rows of posts positioned on a first side of the ridge and a second set of posts comprising at least two rows of posts positioned on a second side of the ridge opposite the first side. The at least two rows of posts of the first set of posts may be staggered relative to each other such that posts in a first row of the first set of posts are positioned adjacent to gaps between adjacent posts in a second row of the first set of posts or may be aligned with the adjacent posts so that the gaps are also aligned with one another vis-à-vis the ridge.

In some embodiments, the antenna block may comprise a plurality of waveguide grooves, each of which may be associated with a different antenna of the antenna block. One or more (in some cases, each) of the plurality of waveguide grooves may comprise a ridge extending therein, and one or more of the ridges may comprise an adapter portion comprising a first end having a first height and a first width and a second end opposite the first end having a second height and a second width, wherein at least one of the first height and the first width of each of the adapter portions of the plurality of waveguide grooves differs from the respective second height/second width of each of the adapter portions of the plurality of waveguide grooves.

In an example of a vehicle sensor module according to some embodiments, the module may comprise a plurality of waveguides, wherein one or more of the waveguides of the plurality of waveguides comprises a waveguide adapter section comprising a first row of posts and, a second row of posts, and a ridge positioned in between the first and second rows of posts. The ridge may transition from a first end having a first height and a first width to a second end opposite the first end, the second end comprising a second height and a second width at the second end, wherein the first width differs from the second width. In some embodiments, the first height may also differ from the second height.

In some embodiments, the second height may be greater than the first height and/or the second width may be less than the first width.

In some embodiments, the adapter portion(s) may smoothly transition between the first width and the second width and/or between the first height and the second height.

In some embodiments, each of the plurality of waveguides may further comprise a section adjacent to the adapter section comprising a ridge having an at least substantially constant height and an at least substantially constant width. In some such embodiments, sections having such ridges with an at least substantially constant height and an at least substantially constant width may be positioned and coupled at both ends of the adapter section.

In some embodiments, each of the plurality of waveguides may comprise at least two rows of posts positioned on a first side of its respective ridge and at least two rows of posts positioned on a second side of its respective ridge opposite the first side.

In an example of an antenna module according to some embodiments, the module may comprise an antenna block comprising a plurality of waveguides formed along a first side of the antenna block. Each of the waveguides of the plurality of waveguides may comprise a first waveguide section, a second waveguide section, and a waveguide adapter section, which may comprise two opposing rows of posts and a ridge positioned in between the two rows of posts. The ridge may taper from a first end having a first height and a first width to a second end opposite the first end, the second end comprising a second height and a second width at the second end. The first height may differ from the second height and the first width may differ from the second width. Each of the waveguide adapter sections may be coupled to the first waveguide section at the first end and to the second waveguide section at the second end.

In some embodiments, the first waveguide section(s) may be configured to receive electromagnetic energy from a printed circuit board. In some such embodiments, the second waveguide section may be configured to transfer electromagnetic waves from the first side of the antenna block to a second side of the antenna block opposite the first side.

The waveguide adapter section of one or more of the plurality of waveguides may further comprise a third row of posts positioned adjacent to the first row of posts on a first side of the ridge and a fourth row of posts positioned adjacent to the second row of posts on a second side of the ridge opposite the first side.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
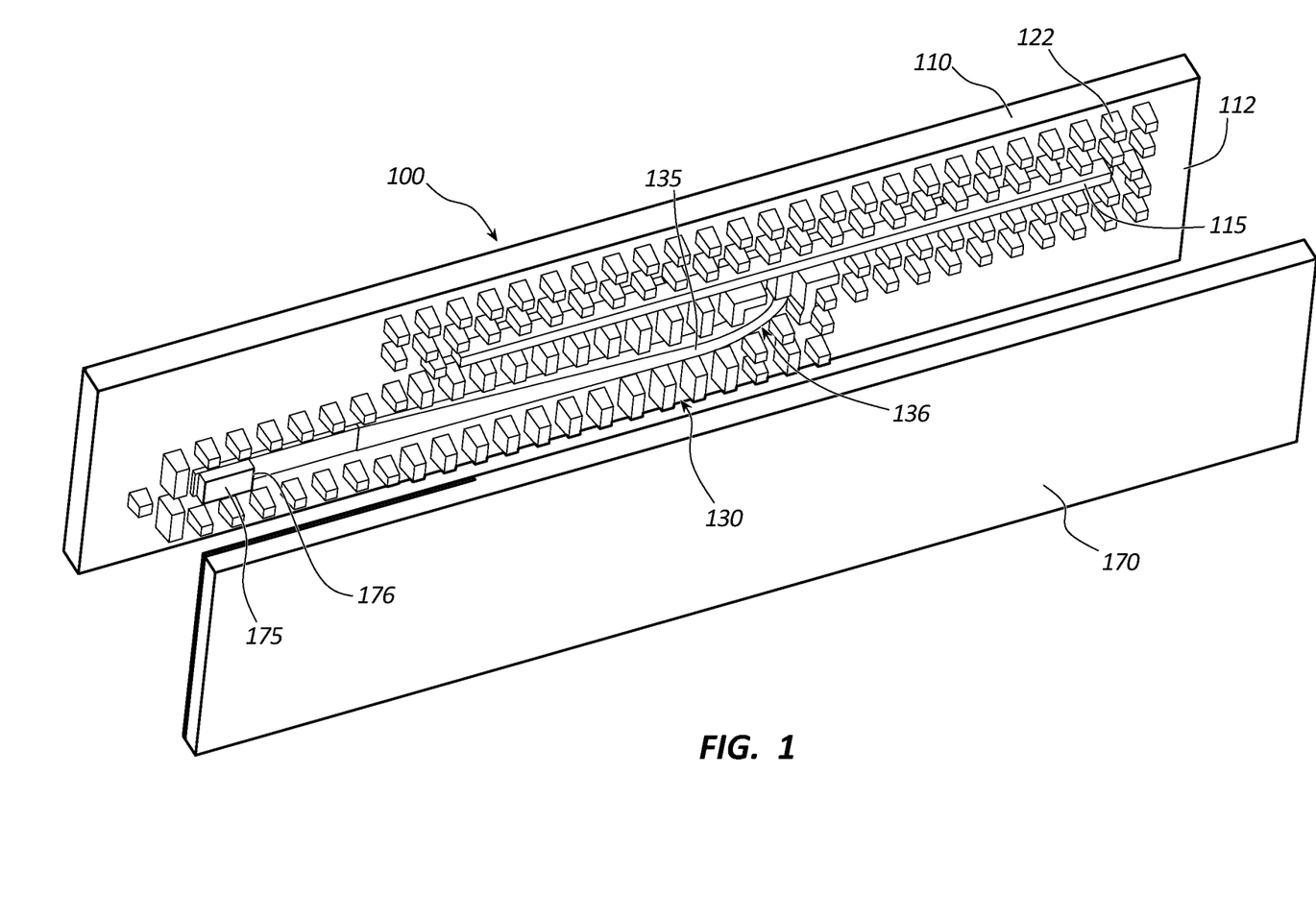
FIG. 1 is an exploded, perspective view of an antenna block that may be incorporated into an antenna assembly, such as a vehicle RADAR sensor assembly, according to some embodiments.

FIGS. 1-4 depict an antenna assembly 100 that may be incorporated into or otherwise used with a vehicle sensor, such as a RADAR sensor assembly, according to some embodiments. Antenna assembly 100 comprises an antenna block 110 that defines, either in whole or in part, one or more waveguides as part of an antenna array comprising one or more antennae, on one or both sides of antenna block 110. Thus, as depicted in FIG. 1, antenna block 110 comprises a plurality of posts 122 arranged in opposing rows on a first side 112 of antenna block 110 to define a waveguide groove therebetween.

It should be understood that although, in preferred embodiments, any number of antennae may be provided and therefore any desired number of corresponding antennae structures—such as a plurality of waveguides, grooves, etc.—may be provided, it is contemplated that some embodiments may comprise an array having a single antenna and therefore only a single waveguide, for example. Such antenna/waveguide/groove may curve about the block/assembly rather than be in a series of parallel lines in some embodiments. As another example, in some embodiments, grooves, slots, or the like may be arranged in a disc formation, or any other suitable formation, including linear, curved, etc. In addition, although the waveguide grooves in the depicted embodiment are defined by rows of posts, it should also be understood that waveguides may be defined in alternative ways in other embodiments, such as by forming a groove within a solid structure (i.e., no posts extending up from the structure), or in any other suitable manner available to those of ordinary skill in the art. It should also be apparent that several of the accompanying figures depict only certain elements and/or aspects of antenna assemblies and/or waveguides and that, in order to properly function, other elements would typically need to be provided in a complete assembly/module.

In preferred embodiments, antenna block 110 may comprise a casting, such as a casting comprising a Zinc or other suitable preferably metal material. However, in other contemplated embodiments, block 110 may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with block/casting 110. For example, a slotted layer may be coupled to the antenna block 110 in some embodiments, in some cases along with other layers and/or elements that are not depicted herein to avoid obscuring the disclosure, to form an antenna assembly 100. In other embodiments, electromagnetic radiation may be emitted using other slots or openings not formed in a separate layer. For example, in the embodiment depicted in FIGS. 1-4, slots 142 are formed in antenna block 110 itself.

Figure 4:
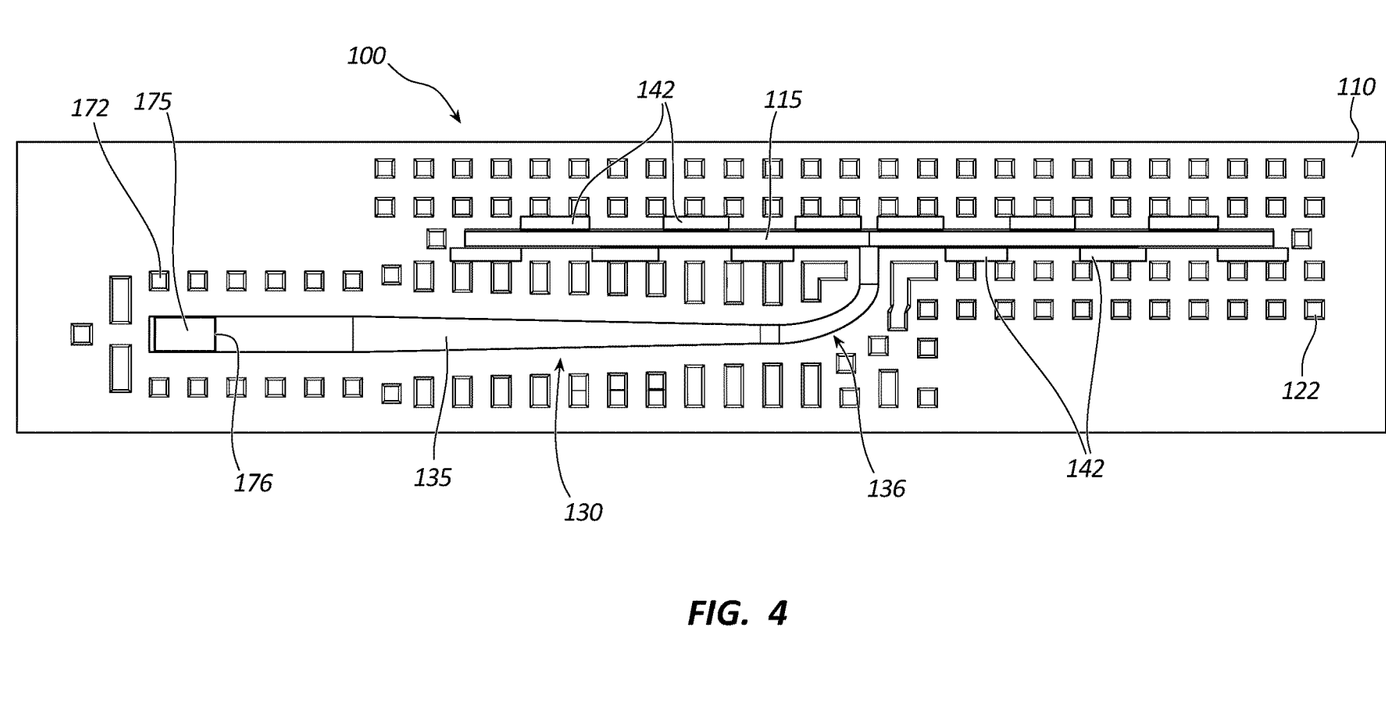
FIG. 4 is a plan view of the waveguide structures of the antenna block of FIGS. 1-3.

As best seen in FIGS. 1 and 4, a ridge is positioned within each of the waveguide grooves. More particularly, an elongated ridge 115 is positioned between opposing rows of posts 122, which may correspond with one or more antennae. Although two spaced rows of posts 122 are positioned on each side of ridge 115, other embodiments are contemplated in which a single row, or more than two rows, of such posts may be positioned on either side of ridge 115 or any of the other ridges disclosed herein.

Figure 2:
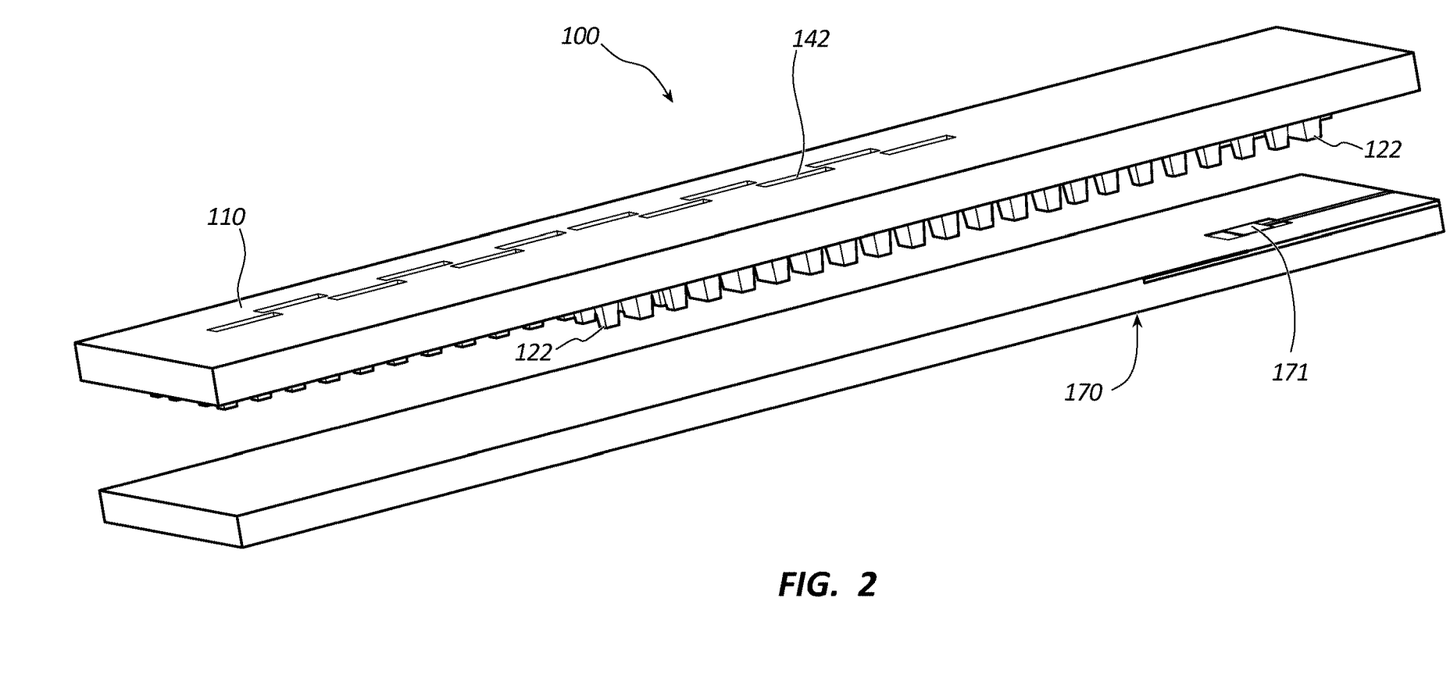
FIG. 2 is an exploded perspective view of the antenna block of FIG. 1 shown from the opposite side.

Electromagnetic radiation may travel within the waveguides defined by the aforementioned posts 122 and ridges 115 and may be transmitted through the various slots 142 formed in block 110. Ridges 115 may be preferred to enhance the characteristics of the waveguide by further facilitating guidance of electromagnetic waves as desired and/or for satisfying size/dimensional demands. Again, in other contemplated embodiments, such slots or other suitable openings may be formed in a separate slotted layer of antenna assembly 100 that may be coupled with block 110. As best seen in FIGS. 2 and 4, slots 142 are staggered with respect to one another on opposite sides of ridge 115.

Preferably, when a slotted layer is present, this layer comprises a metal or other conductive material. Such a slotted layer may be coupled with block 110 in a variety of possible ways. For example, an adhesive, solder, heat stakes, screws, other fasteners, and the like may be used to couple the slotted layer to block 110. Similar structures and/or techniques may be used to couple other layers or other elements of the assembly together, such as coupling the casting to a PCB, for example. In some embodiments, another layer, such as a layer of (preferably conductive) adhesive tape, may be inserted in between block 110 and the slotted layer, which may, either entirely or in part, be used to provide this coupling. In embodiments in which solder is used, such solder may be applied to the top of one or more (in some embodiments, all) of posts 122 and/or ridges 115 (if present).

Figure 3:
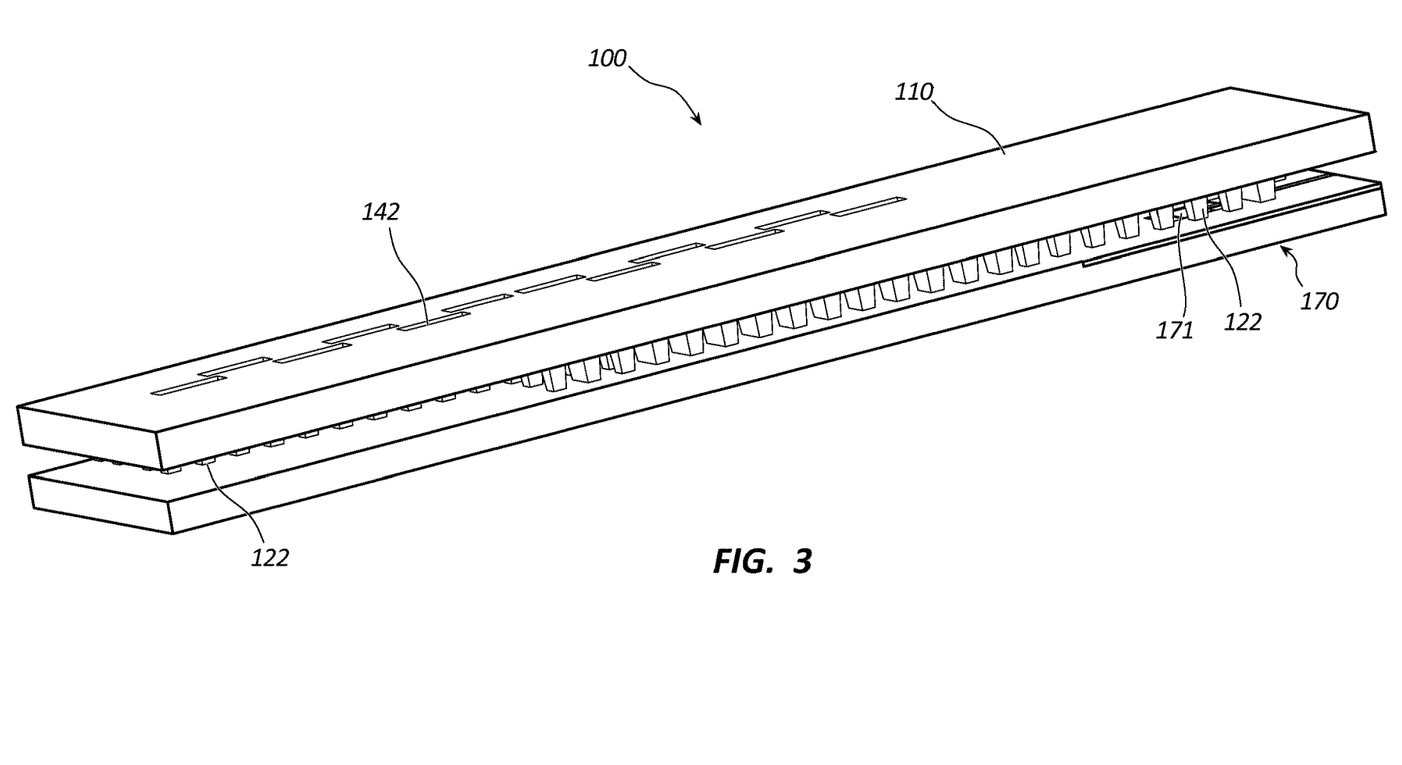
FIG. 3 is a perspective view of the antenna block of FIGS. 1 and 2.

As shown in FIG. 3, in some embodiments, each of the elements of assembly 100 may be integrally formed in a single layer and/or block element, including, as previously mentioned, slots 142. Alternatively, casting 110 may define posts 122 and various other elements of assembly 100 and another layer may be coupled to casting 110 to define a seat or ceiling to the assembly.

Antenna assembly 100 further comprises a PCB or other electromagnetic-generating element 170 or another suitable element from which electromagnetic waves may be generated to feed one or more waveguide structures. In the depicted embodiment, PCB 170 is provided in a separate layer but in other embodiments may be provided in the same layer and be otherwise coupled to antenna block 110. In addition, PCB 170 may be integrally formed with block 110 or coupled thereto, whether layered or side-by-side with the antenna elements of assembly 100.

In some embodiments, one or more of PCBs, PCB layers, or the like may be functionally coupled to block 110 by providing a microstrip and/or patch antenna element 171, as shown in FIG. 2.

A terminal ridge 175 may be positioned within opposing rows of posts 172 on another portion of side 112 (see FIG. 4). Ridge 175 may comprise a ledge 176 at which point the height of ridge 175 may be sharply reduced, as best seen in FIG. 1. In alternative embodiments, however, ledge 176 may be replaced with a gradual taper or multiple steps that more gradually reduce the height of ridge 175. As best seen in FIG. 4, the width of ridge 175 is greater than the width of ridge 115 and, as best seen in FIG. 1, the height of the portion of ridge 175 that couples to the adjacent waveguide of block 110 (after the reduction in height resulting from ridge 175) is also less than the height of ridge 115. Thus, to provide a preferably smooth transition between one or both of these dimensions, antenna assembly 100 further comprises an adapter portion 130.

Adapter portion 130 is configured to facilitate a transition from one waveguide cross-section to another, such as a ridge having a first cross-sectional dimension/area to another having another cross-sectional dimension/area, which may be used in a variety of contexts. In the depicted embodiment, adapter portion 130 may be configured to couple the transition from the waveguide associated with terminal ridge 175 to the waveguide associated with elongated ridge 115. In other embodiments, a similar adapter may be used, for example, to couple a transition between a PCB or other EM-launching element and a first waveguide structure to a gap waveguide structure, which may be used to transition electromagnetic radiation between opposite sides of an antenna block. As discussed in greater detail below, in preferred embodiments, adapter portion 130 may provide a gradual transition between adjacent waveguides or other antennae structures so as to keep reflections low. In addition, in preferred embodiments, adapter portion 130 may act as an impedance transformer within antenna assembly 100.

As shown in FIGS. 1 and 2, adapter portion 130 comprises a ridge 135 that transitions in height and width from one end to the opposite end. Thus, ridge 135 comprises a first end having a first height and a first width and a second end opposite the first end having a second height and a second width. The first height differs from the second height and the first width differs from the second width. More particularly, ridge 135 has a second height at the second end that is greater than the first height at the first end, and has a second width at the second end that is less than the first width at the first end such that ridge 135 of adapter portion 130 transitions from a short, wide base adjacent to the microstrip 171 or other feed element of PCB 170, which may couple with ridge 175, preferably smoothly, to a taller, narrower ridge portion at the opposite end that may, preferably smoothly, couple with ridge 135. Ridge 135 then transitions along a curved portion 136 to direct electromagnetic radiation into the waveguide structures associated with ridge 115. As those of ordinary skill in the art will appreciate, similar to many of the elements shown in the drawings and/or otherwise disclosed herein, curved portion 136 is optional and may form part of ridge 115 in alternative embodiments. In other words, the taper provided by adapter portion 130 may taper to the beginning of a curved section which may be considered part of the adjacent ridge (ridge 115) or the tapering may continue along curved portion 136.

In the depicted embodiment, ridge 135 of adapter portion 130 smoothly transitions between the first width and the second width and smoothly transitions between the first height and the second height. In other words, rather than transitioning in a step-wise manner, ridge 135 tapers in both height and width, which may be preferred for certain applications. However, it is contemplated that one or both of these transitions may be non-smooth in alternative embodiments. For example, in some embodiments, the adapter portion may comprise a ridge that is stepped in height and/or width rather than smoothly tapering. In some embodiments, the adapter portion may comprise a plurality of distinct sections, in which one or more (in some such embodiments, each) of the sections comprises a ridge transitioning between a respective first height and second height differing from the respective first height, and between a respective first width and second width differing from the respective first width, either in a step-wise or smoothly transitioning manner. Each section may then be stepped with respect to the adjacent section if desired. In addition, although in preferred embodiments both the height and the width may taper or otherwise vary in the adapter section, in alternative embodiments, only the height or only the width may so taper/vary. It is also contemplated that in still other embodiments, one or both of the dimensional transitions may be in the opposite direction if desired and/or dictated by design considerations.

It can also be seen in several of the figures that posts 122 may vary in height, width, or other dimensions as needed along various portions of the depicted waveguides. Similarly, the location of the posts, including but not limited to their spacing from an adjacent ridge, if present, may vary as needed.

Figure 5:
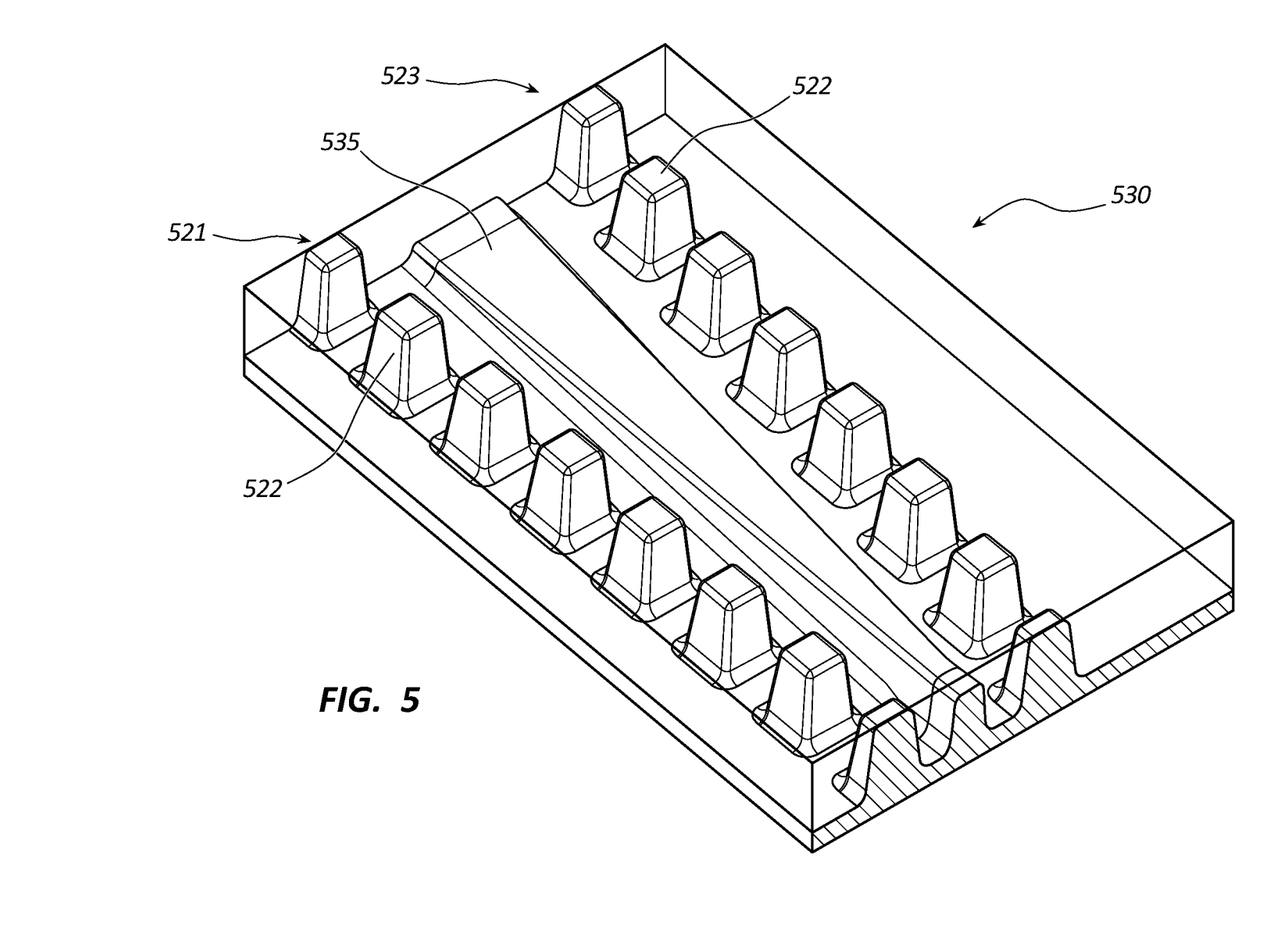
FIG. 5 is a perspective view of a transitional waveguide structure that may be used as an adapter section of an antenna assembly according to other embodiments.

FIG. 5 depicts an adapter portion 530 according to another embodiment, which may be incorporated into an antenna module to couple adjacent waveguide sections together, preferably to minimize signal loss and/or reflections, as previously mentioned. The adjacent structures that would typically be present are not shown in this figure but may include a variety of adjacent waveguides of various types, or other elements, some of which are discussed herein and others of which would be apparent to those of ordinary skill in the art after having received the benefit of this disclosure. Similar to adapter portion 130 discussed above, adapter portion 530 comprises a waveguide groove defined by opposing posts 522 arranged in rows. Similarly, a transitional ridge 535 is positioned within the waveguide groove, which tapers in both height and width between its opposing ends to facilitate a smooth transition between, for example, a PCB to waveguide portion of an antenna assembly and a waveguide of a distinct type, such as a double-ridged waveguide or another similar waveguide extending through an antenna block to direct electromagnetic radiation from one side of an antenna block to the other or otherwise from one region of an antenna to another, as discussed below.

It can also be seen in FIG. 5 that adapter portion 530 comprises a first row 521 of posts 522 and a second row 523 of posts positioned opposite from one another with the first row 521 arranged in a straight line such that each post 522 in row 521 is aligned with its adjacent posts. By contrast, row 523 consists of posts 522 that are arranged in a diagonal fashion relative to its adjacent posts 522. Thus, in some embodiments, ridge 535 may be arranged in a similar manner with one side (the side adjacent to row 521) arranged parallel to its adjacent posts and the opposite side also parallel to its adjacent posts in row 523 but tapering outward to form the widening taper previously mentioned. In this manner, the spacing between ridge 535 and its adjacent posts on both sides may be consistent, or at least substantially consistent.

Of course, a wide variety of alternative embodiments are contemplated. For example, in some embodiments, both opposing rows of posts may taper away from one another in a V-shape. In some embodiments, the spacing between the posts and the ridge need not be consistent. In still other embodiments, a waveguide adapter may be provided that includes a transitional ridge, whether tapering in one or both dimensions or transitionally stepped in one or both dimensions, that is positioned within a more traditional waveguide groove or another type of waveguide lacking the posts depicted in the accompanying figures.

Figure 6:
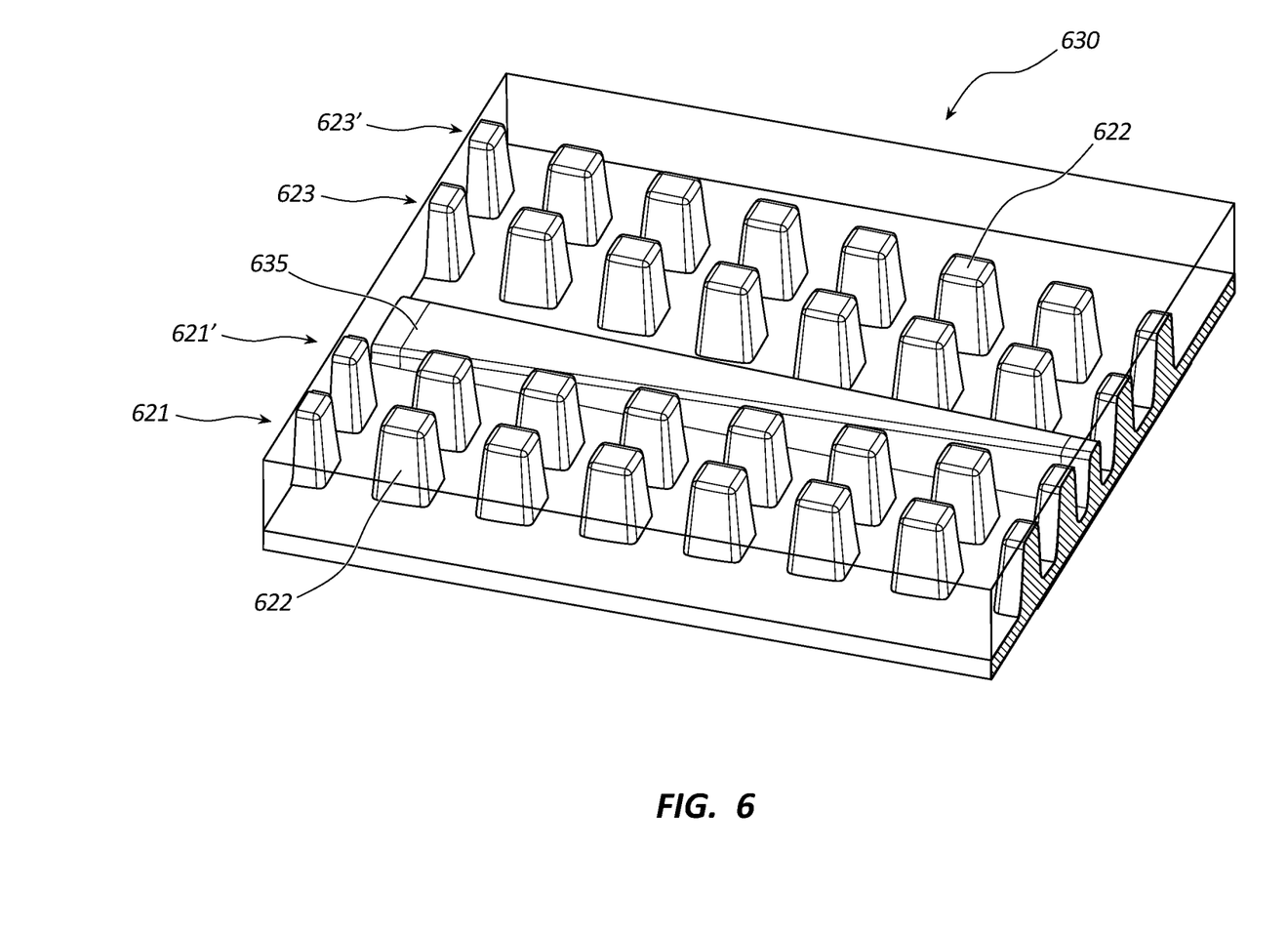
FIG. 6 is a perspective view of a transitional waveguide structure that may be used as an adapter section of an antenna assembly according to still other embodiments.

FIG. 6 depicts another example of an adapter portion 630 according to another embodiment. Again, adapter portion 630 may be incorporated into an antenna module to couple adjacent waveguide sections having differing dimensions, such as waveguide sections having ridges with differing heights and/or widths, together, preferably to minimize signal loss and/or reflections, as previously mentioned. Adapter portion 630 again comprises a waveguide groove defined by opposing posts 622 arranged in rows. However, in this embodiment, two rows of posts 622 are provided on each side of transitional ridge 635, which is positioned within the waveguide groove defined by the opposing rows of posts 622. Once again, transitional ridge 635 preferably tapers in both height and width between its opposing ends to facilitate a smooth transition between two waveguides having distinct cross-sectional dimensions.

It can also be seen in FIG. 6 that adjacent rows 621 and 621' of posts 622 on one side of ridge 635 and adjacent rows 623 and 623' of posts 622 positioned on the opposite side of ridge 635 are aligned, or at least substantially aligned, with the posts 622 in the adjacent row on the same side. In other words, the space in between each adjacent post in row 621 is aligned with the space between each adjacent post in row 621' relative to ridge 635. Similarly, the space in between each adjacent post in row 623 is aligned with the space between each adjacent post in row 623' relative to ridge 635.

Adapter portion 630 is otherwise similar to adapter portion 530 in that the posts on one side (rows 621 and 621') are arranged in a linear fashion and the posts on the opposite side of ridge 635 (rows 623 and 623') are arranged in a diagonal fashion. These aspects may vary, however, in any of the ways previously mentioned in alternative embodiments.

Figure 7:
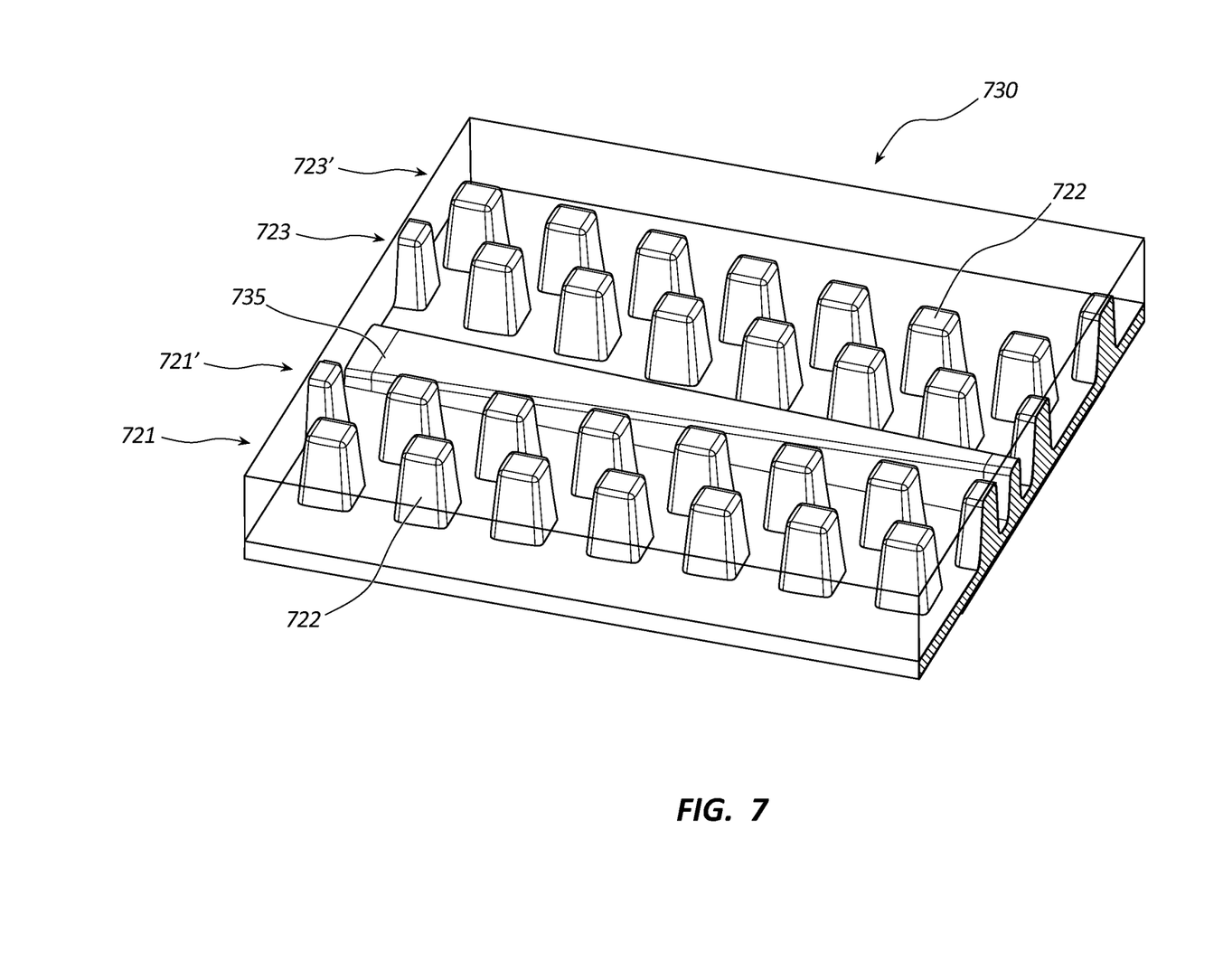
FIG. 7 is a perspective view of a transitional waveguide structure that may be used as an adapter section of an antenna assembly according to additional embodiments.

FIG. 7 depicts another example of an adapter portion 730 according to still other embodiments. Again, adapter portion 730 may be incorporated into an antenna module to couple adjacent waveguide sections having differing dimensions, such as waveguide sections having ridges with differing heights and/or widths, together, preferably to minimize signal loss and/or reflections, as previously mentioned. Adapter portion 730 again comprises a waveguide groove defined by opposing posts 722 arranged in rows. Like adapter portion 630, adapter portion 730 comprises two rows of posts 722 on each side of transitional ridge 735, which tapers in both height and width between its opposing ends to facilitate a smooth transition between two waveguides having distinct cross-sectional dimensions. Of course, as with any of the embodiments disclosed herein, a single row of posts may be positioned on either side of the ridge and/or the waveguide may be defined by grooves not defined by posts at all.

However, unlike adapter portion 630, adapter portion 730 comprises adjacent rows of posts 722 on either side of ridge 735 that are staggered relative to one another. In other words, posts 722 in row 721 are offset with respect to the posts 722 in the adjacent row 721'. Similarly, the posts 722 in row 723 are offset with respect to the posts 722 in the adjacent row 723' positioned on the opposite side of ridge 735. Adapter portion 730 is otherwise similar to adapter portion 630 but may vary in any of the ways previously mentioned, or in other ways available to those of ordinary skill in the art, in alternative embodiments.

Figure 8:
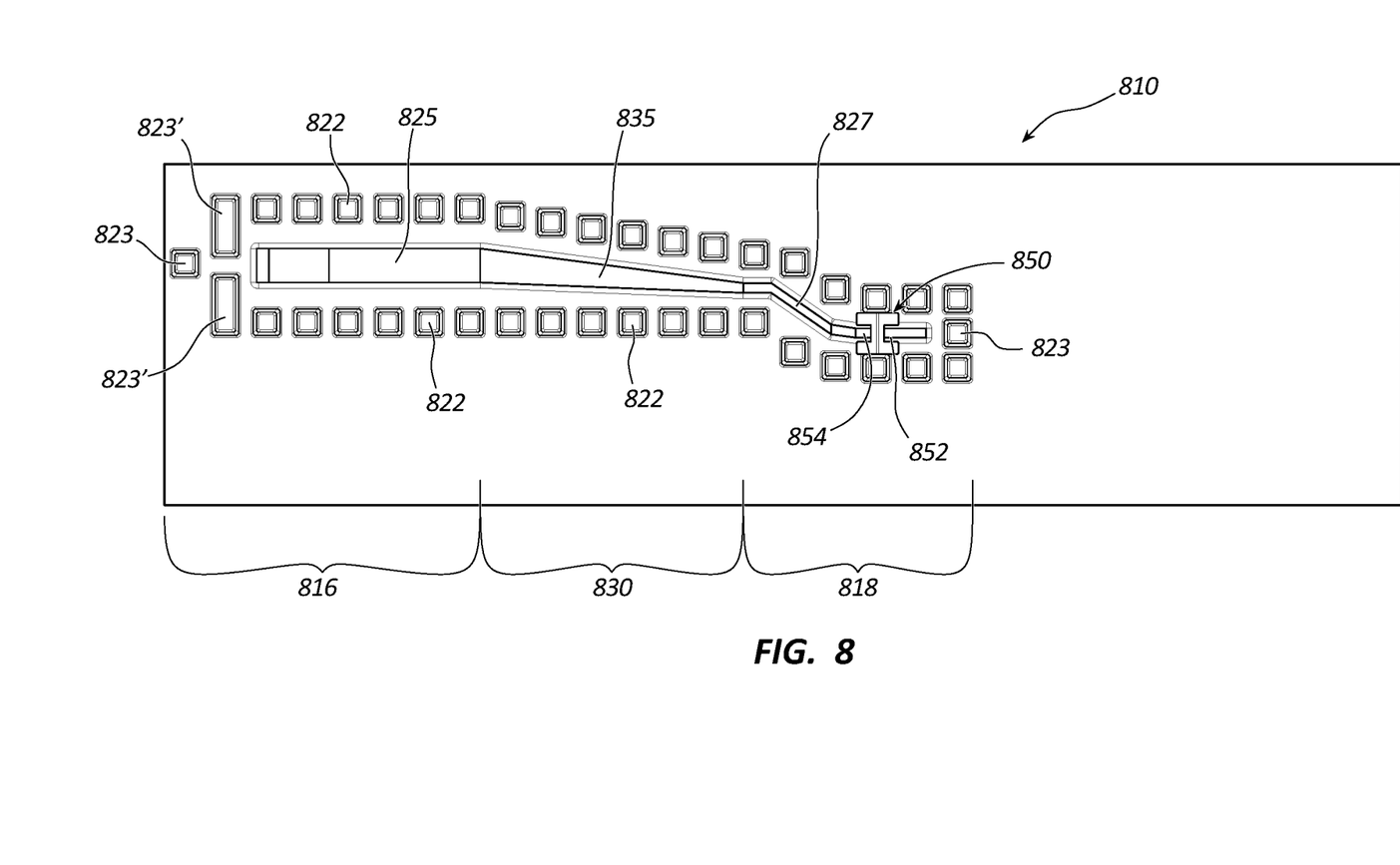
FIG. 8 is a plan view of a waveguide structure comprising an adapter section of other embodiments.

FIG. 8 is a plan view of another antenna block 810 according to still other embodiments that may be incorporated into a variety of antenna assemblies, including any of the antenna assemblies disclosed herein. Antenna block 810 comprises a plurality of adjacent waveguide sections. More particularly, antenna block 810 comprises a first waveguide section 816 that comprises a waveguide groove defined by opposing rows of posts 822 and a waveguide ridge 825 positioned therein. Terminal posts are also present at the end of the waveguide groove, and include a terminal post 823 positioned along the axis of waveguide ridge 825, which terminal post 823 may be the same or similar in dimension to the other posts 822 and two larger terminal posts 823' positioned just inside of terminal post 823 and adjacent to opposite rows of posts 822.

Waveguide section 816 may comprise, for example, a waveguide feed section from a PCB or other source of electromagnetic radiation. Thus, in some embodiments, the antenna assembly incorporating antenna block 810 may comprise another layer or adjacent element, such as a PCB, to supply such radiation. In some such embodiments, for example, electromagnetic energy may be propagated from a microstrip into waveguide section 816. In other embodiments, however, waveguide section 816 may receive electromagnetic radiation from another adjacent waveguide or waveguide section without directly receiving such radiation.

Another waveguide section 818 is positioned on the opposite end of antenna block 810 relative to waveguide section 816. Waveguide section 818 again comprises a waveguide groove defined by opposing rows of posts 822 and a waveguide ridge 827 positioned therein. Terminal posts 823 are also present at the end of the waveguide groove. Waveguide ridge 827 also angles downward at a first angle relative to the adjacent waveguide ridge (waveguide ridge 825) and again at a second angle relative to the first angled portion, as also shown in FIG. 8.

In addition, waveguide section 818 is coupled to a tunnel or "hole" waveguide 850 extending between opposing surfaces of antenna block 810. In the depicted embodiment, waveguide 850 comprises two opposing ridges, namely, ridge 852 and ridge 854, which face one another and extend from the opposing surfaces of an opening, which, again, extends between opposing surfaces of antenna block 810. Waveguide section 818 may therefore be thought of as a transition from a waveguide groove to a waveguide hole/tunnel. In addition, the opposing ridges 852 and 854 formed within this hole/tunnel form the shape of a letter "H" and may therefore be referred to as an "H-shaped" or "double-ridged" waveguide. In alternative embodiments, only a single ridge may be formed in this hole/tunnel, which may instead, at least substantially, form the shape of the letter "U" and/or the Greek letter π.

As also shown in FIG. 8, ridge 827 of waveguide section 818 has a width that is less than ridge 825 of waveguide section 816. Although not visible in FIG. 8, it should also be apparent that, as discussed above, ridge 827 of waveguide section 818 may also have a greater height than ridge 825 of waveguide section 816. Thus, an adapter section 830 is provided to provide a preferably smooth transition between one or both of these two ridge cross-sectional areas/dimensions. Thus, waveguide ridge 835 of adapter section 830 comprises a thickness that tapers between its opposing ends to smoothly transition between the wider ridge 825 of waveguide section 816 and the narrower ridge 827 of waveguide section 818. As mentioned above and shown in other figures, this taper, or a stepped or otherwise non-smooth transition in one or more cross-sectional dimensions, may also take place along the height of transitional waveguide ridge 835 if desired.

As also previously mentioned, whereas transitional waveguide ridge 835 has a straight side and an opposite tapering side, in alternative embodiments, both sides may taper if desired. Similarly, although the same is true for the opposing rows of posts 822 (i.e., one side tapers and the other comprises posts 822 arranged in a non-tapering row), again, alternative embodiments are contemplated in which both rows of posts 822 may taper instead.

It should also be understood that, whereas the antenna blocks shown in the accompanying figures are generally shown with a single groove, which may be thought of as providing a single "antenna" when coupled with adjacent slots, which slots may be formed in a separate layer or in one of the disclosed antenna blocks themselves, any number of waveguide grooves may be provided as desired, and each such waveguide/waveguide groove may be associated with a different antenna of the antenna block.

It should also be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An antenna module, comprising:
an antenna block defining a waveguide groove on a first side of the antenna block; and
a ridge extending within the waveguide groove, wherein the waveguide groove comprises an adapter portion, the adapter portion comprising:
a first end comprising a first height and a first width at the first end; and
a second end opposite the first end, the second end comprising a second height and a second width at the second end, wherein the first height differs from the second height, and wherein the first width differs from the second width, wherein the adapter portion comprises a plurality of distinct sections, and wherein a ridge of each of the plurality of distinct sections transitions between a respective first height and second height differing from the respective first height, and between a respective first width and second width differing from the respective first width.

2. The antenna module of claim 1, wherein the second height is greater than the first height, and wherein the second width is less than the first width.

3. The antenna module of claim 2, wherein the adapter portion smoothly transitions between the first width and the second width.

4. The antenna module of claim 3, wherein each of the first height, the first width, the second height, and the second width are defined by a ridge of the adapter portion, and wherein the adapter portion smoothly transitions between the first height and the second height.

5. The antenna module of claim 1, wherein the waveguide groove is at least partially defined by a plurality of posts positioned opposite from one another, and wherein the ridge is positioned within the waveguide groove between opposite posts of the plurality of posts.

6. The antenna module of claim 5, wherein the plurality of posts comprises a first set of posts comprising at least two rows of posts positioned on a first side of the ridge and a second set of posts comprising at least two rows of posts positioned on a second side of the ridge opposite the first side.

7. The antenna module of claim 6, wherein at least two rows of posts of the first set of posts are staggered relative to each other such that posts in a first row of the first set of posts are positioned adjacent to gaps between adjacent posts in a second row of the first set of posts.

8. The antenna module of claim 5, wherein the ridge comprises a first side and a second side opposite the first side, a ridge width being defined between the first and second sides, wherein the first side is straight, and wherein the second side tapers between the first end and the second end.

9. The antenna module of claim 1, wherein the antenna block comprises a plurality of waveguide grooves each associated with a different antenna of the antenna block, wherein each of the plurality of waveguide grooves comprises a ridge extending therein, and wherein at least one of the ridges comprises an adapter portion comprising:
a first end having a first height and a first width; and
a second end opposite the first end having a second height and a second width, wherein the first height differs from the second height, and wherein the first width differs from the second width.

10. The antenna module of claim 1, wherein the antenna module comprises a vehicle RADAR module.

11. A vehicle sensor module, comprising:
a plurality of waveguides, wherein each of the waveguides of the plurality of waveguides comprises a waveguide adapter section configured to facilitate a transition between adjacent ridges of the vehicle sensor module, each respective waveguide adapter section comprising:
a first row of posts;
a second row of posts; and
a ridge positioned in between the first and second rows of posts, wherein the ridge transitions from a first end having a first height and a first width to a second end opposite the first end, the second end comprising a second height and a second width at the second end, wherein the first width differs from the second width.

12. The vehicle sensor module of claim 11, wherein the first height differs from the second height.

13. The vehicle sensor module of claim 12, wherein the second height is greater than the first height, and wherein the second width is less than the first width.

14. The vehicle sensor module of claim 13, wherein the adapter portion smoothly transitions between the first width and the second width, and wherein the adapter portion smoothly transitions between the first height and the second height.

15. The vehicle sensor module of claim 11, wherein each of the plurality of waveguides further comprises a section adjacent to the adapter section comprising a ridge having an at least substantially constant height and an at least substantially constant width.

16. The vehicle sensor module of claim 11, wherein each of the plurality of waveguides comprises at least two rows of posts positioned on a first side of its respective ridge and at least two rows of posts positioned on a second side of its respective ridge opposite the first side.

17. An antenna module, comprising:
an antenna block comprising a plurality of waveguides formed along a first side of the antenna block, wherein at least one of the waveguides of the plurality of waveguides comprises:
a first waveguide section;
a second waveguide section; and
a waveguide adapter section comprising:
a first row of posts;
a second row of posts; and
a ridge positioned in between the first and second rows of posts, wherein the ridge tapers from a first end having a first height and a first width to a second end opposite the first end, the second end comprising a second height and a second width at the second end, wherein the first height differs from the second height, wherein the first width differs from the second width, wherein each respective waveguide adapter section of the at least one of the waveguides of the plurality of waveguides is coupled to a respective first waveguide section at the first end, and is coupled to a respective second waveguide section at the second end.

18. The antenna module of claim 17, wherein the first waveguide section is configured to receive electromagnetic energy from a printed circuit board, and wherein the second waveguide section is configured to transfer electromagnetic waves from the first side of the antenna block to a second side of the antenna block opposite the first side.

19. The antenna module of claim 17, wherein the waveguide adapter section of each of the at least one waveguides further comprises a third row of posts positioned adjacent to the first row of posts on a first side of the ridge and a fourth row of posts positioned adjacent to the second row of posts on a second side of the ridge opposite the first side.

* * * * *

UNITED STATES PATENT AND TRADEMARK OFFICE
CERTIFICATE OF CORRECTION

PATENT NO. : 11,283,162 B2
APPLICATION NO. : 16/520257
DATED : March 22, 2022
INVENTOR(S) : Scott B. Doyle et al.

Page 1 of 1

It is certified that error appears in the above-identified patent and that said Letters Patent is hereby corrected as shown below:

On the Title Page

The cities and states of residence for Inventors Scott B. Doyle and Angelos Alexanian should appear as follows:
Scott B. Doyle, Sudbury, MA (US);
Angelos Alexanian, Lexington, MA (US)

Signed and Sealed this
Twenty-fourth Day of January, 2023

Katherine Kelly Vidal
*Director of the United States Patent and Trademark Office*